(12) United States Patent
Heim et al.

(10) Patent No.: US 9,624,049 B1
(45) Date of Patent: Apr. 18, 2017

(54) PUNCTURE RESISTANT SEALS FOR LOADING DOCKS

(71) Applicants: Frank Heim, Platteville, WI (US);
Gary Borgerding, Dubuque, IA (US);
Ryan Withrow, Platteville, WI (US)

(72) Inventors: Frank Heim, Platteville, WI (US);
Gary Borgerding, Dubuque, IA (US);
Ryan Withrow, Platteville, WI (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 0 days.

(21) Appl. No.: 15/073,252

(22) Filed: Mar. 17, 2016

(51) Int. Cl.
B65G 69/00 (2006.01)
E04F 10/02 (2006.01)

(52) U.S. Cl.
CPC ............ B65G 69/008 (2013.01); E04F 10/02 (2013.01)

(58) Field of Classification Search
CPC .................................. B65G 69/08; E04F 10/02
See application file for complete search history.

(56) References Cited

U.S. PATENT DOCUMENTS

| 3,322,132 A | 5/1967 | Rieder et al. |
| 3,403,489 A | 10/1968 | Frommelt et al. |
| 3,613,324 A | 10/1971 | Conger |
| 3,653,173 A | 4/1972 | Frommelt et al. |
| 3,826,049 A | 7/1974 | Frommelt et al. |
| 3,915,183 A | 10/1975 | Frommelt |
| 4,062,157 A * | 12/1977 | Potthoff ............... B65G 69/008 135/115 |
| 4,070,801 A | 1/1978 | O'Neal |
| 4,365,452 A | 12/1982 | Fillman et al. |
| 4,495,737 A | 1/1985 | Alten |

(Continued)

FOREIGN PATENT DOCUMENTS

| CA | 2860988 A1 * | 8/2013 | ........... B65G 69/008 |
| DE | 2239483 | 2/1974 | |

(Continued)

OTHER PUBLICATIONS

Frommelt, "Rain Diverter Curtain," Rite Hite Holding Corporation, Jul. 1, 1992 (1 page).

Primary Examiner — Jeanette E Chapman
(74) Attorney, Agent, or Firm — Hanley, Flight & Zimmerman, LLC

(57) ABSTRACT

Puncture resistant seals for loading docks are disclosed. An example weather barrier disclosed herein includes a canopy having a back end and a front end, where the back end is mountable to a wall above a doorway and the front end is to protrude forward from the wall when the canopy is mounted to the wall. A front bar is at the front end of the canopy and the front bar is horizontally elongate. A back curtain hangs from the front bar. The back curtain has an upper curtain edge attached to the front bar. The back curtain has a lower curtain edge that is at a lower elevation than an elevation of the upper doorway edge when the canopy is mounted to the wall. The back curtain has a curtain width. A front panel hangs in front of the back curtain. The front panel is less flexible than the back curtain. The front panel has a panel width that is approximately 50 to 80 percent of the curtain width. A space is interposed between and defined by the front panel and the back curtain.

24 Claims, 13 Drawing Sheets

(56) References Cited

U.S. PATENT DOCUMENTS

| | | | |
|---|---|---|---|
| 4,554,768 A * | 11/1985 | Srajer | B65G 69/008 160/243 |
| 4,799,342 A * | 1/1989 | Klevnjans | E04F 10/04 52/173.2 |
| 5,125,196 A * | 6/1992 | Moody | B65G 69/008 52/173.2 |
| 5,167,101 A | 12/1992 | Alten | |
| 5,174,075 A | 12/1992 | Alten | |
| 5,195,285 A | 3/1993 | Alten | |
| 5,282,342 A | 2/1994 | Brockman et al. | |
| 5,622,016 A | 4/1997 | Frommelt et al. | |
| 5,927,025 A | 7/1999 | Brockman et al. | |
| 6,205,721 B1 | 3/2001 | Ashelin et al. | |
| 6,233,885 B1 | 5/2001 | Hoffmann et al. | |
| 7,185,463 B2 * | 3/2007 | Borgerding | B65G 69/008 52/173.2 |
| 8,042,307 B2 | 10/2011 | Digmann et al. | |
| 8,307,588 B2 | 11/2012 | Hoffmann et al. | |
| 8,327,587 B2 * | 12/2012 | Digmann | B65G 69/008 52/173.1 |
| 8,458,960 B2 | 6/2013 | Digmann et al. | |
| 9,079,713 B2 | 7/2015 | Digmann et al. | |
| 2003/0140579 A1 | 7/2003 | Hoffmann et al. | |
| 2007/0175116 A1 | 8/2007 | Borgerding | |
| 2010/0269427 A1 | 10/2010 | Digmann et al. | |
| 2013/0047526 A1 | 2/2013 | Digmann et al. | |
| 2013/0239494 A1 | 9/2013 | Digmann et al. | |
| 2015/0007512 A1 | 1/2015 | Digmann et al. | |
| 2015/0376894 A1 | 12/2015 | Digmann et al. | |

FOREIGN PATENT DOCUMENTS

| | | | |
|---|---|---|---|
| DE | 4111367 A1 * | 3/1992 | B65G 69/008 |
| EP | 0173929 | 3/1986 | |
| EP | 0493713 | 7/1992 | |
| EP | 1550624 | 7/2005 | |
| GB | 1509935 | 5/1978 | |

\* cited by examiner

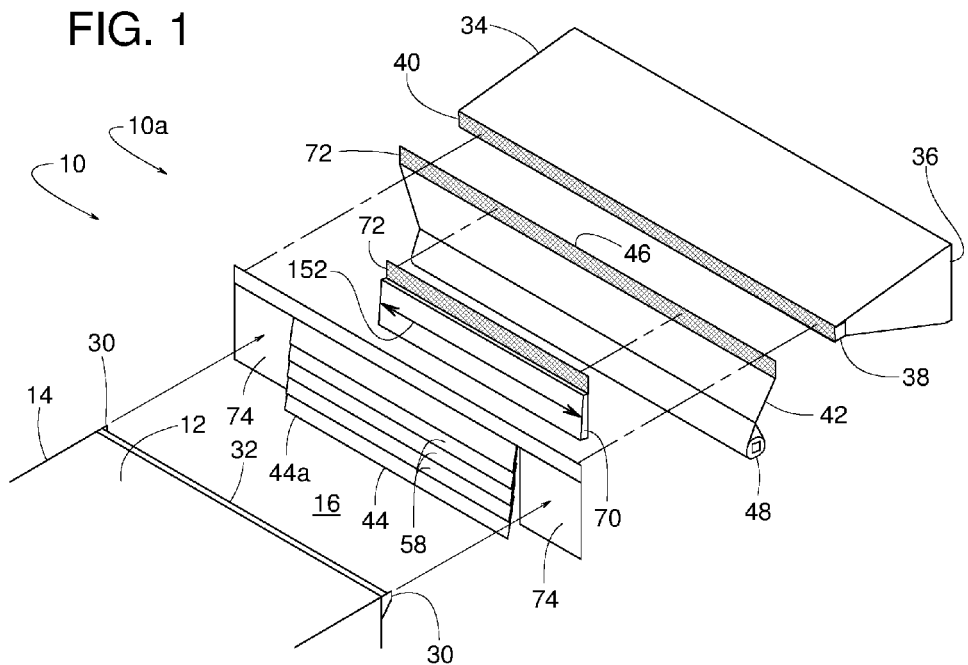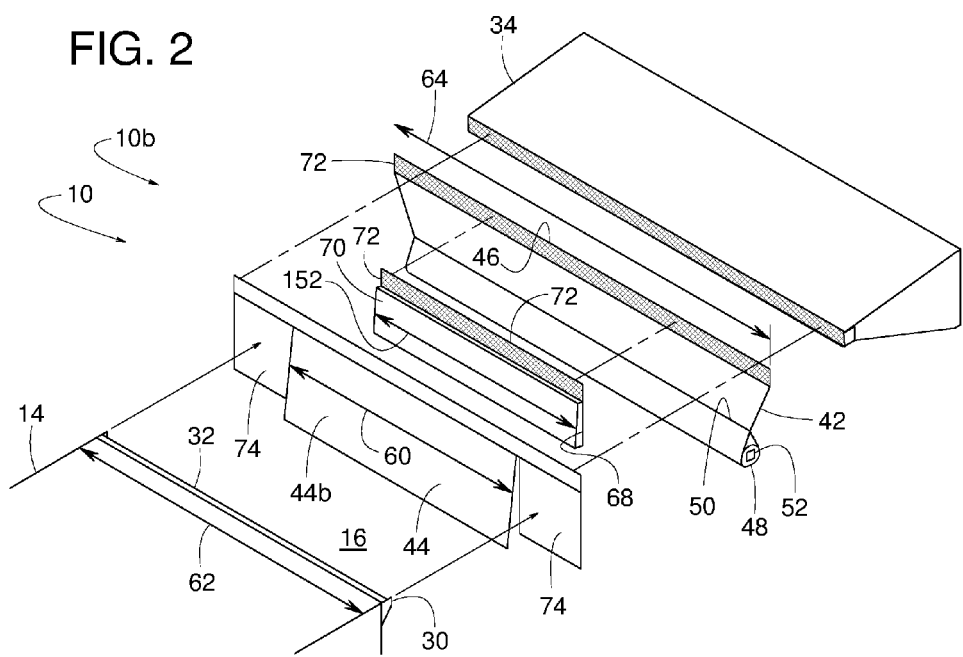

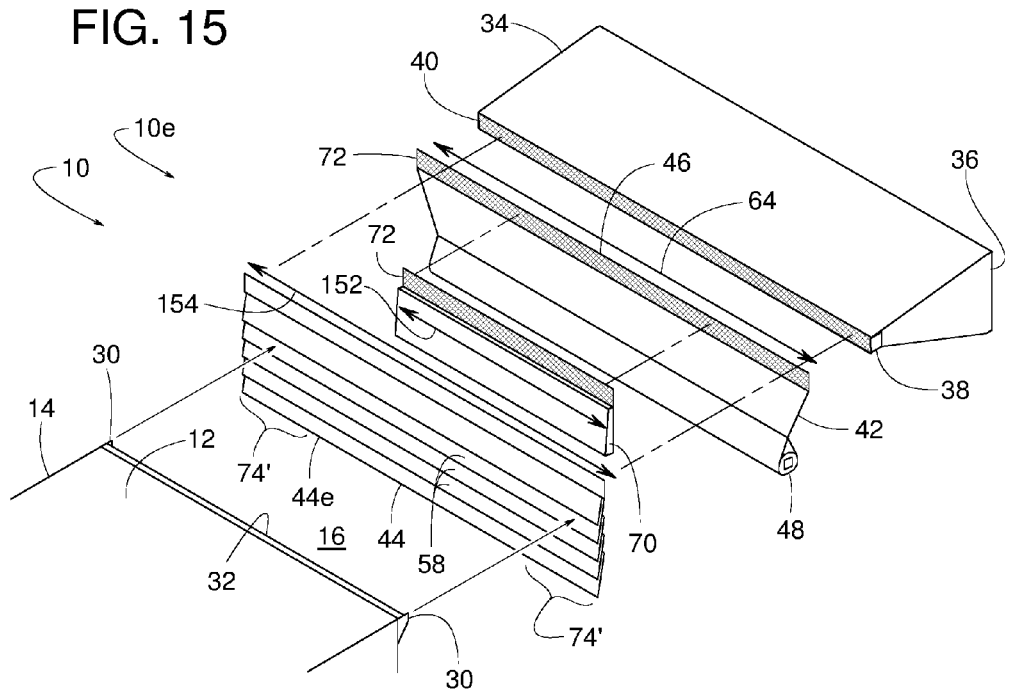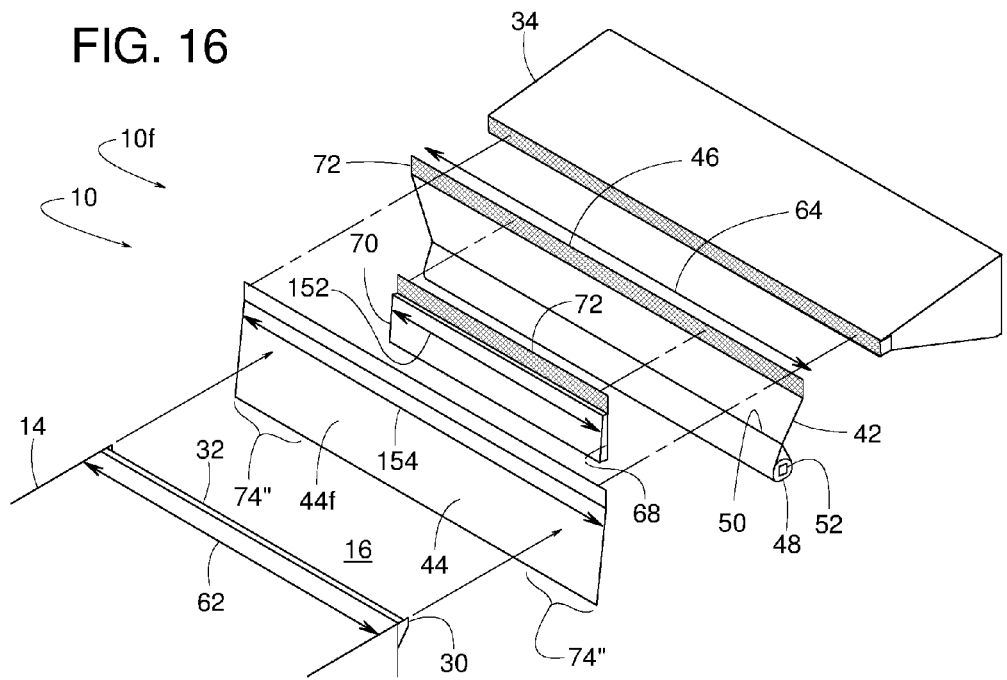

PUNCTURE RESISTANT SEALS FOR LOADING DOCKS

FIELD OF THE DISCLOSURE

The present disclosure relates generally to weather barriers such as dock seals and/or dock shelters for vehicle loading docks and, more specifically, to puncture resistant seals for loading docks.

BACKGROUND

Dock weather barriers (weather barrier apparatus), such as dock seals and dock shelters, restrict or prevent the ingress of outdoor environmental conditions or contaminants (e.g., rain, snow, wind, hot/cold temperatures, insects, animals, etc.) into the interior of a building and cargo area of a vehicle during the loading or unloading of the vehicle. Dock shelters and seals can also prevent the egress of conditioned air from within a building and/or a vehicle cargo area to the outdoor environment. Examples of dock seals and/or shelters with various header structures and side structures are disclosed in U.S. Pat. Nos. 6,205,721; 6,233,885; 7,185,463 and 8,307,588.

Some known dock seals use side members having a compressible foam core or body surrounded by a coated fabric or vinyl outer layer. The foam core provides sufficient structural rigidity to enable the side members to be extended a short distance from the building wall surrounding the loading dock. The coated fabric outer layer protects the foam core from outdoor environmental conditions (e.g., moisture), provides wear resistance to repeated impacts from the rear portions of vehicles, and may provide desirable aesthetic qualities. Additionally, a header structure may span between and/or above the side members and is installed along a top portion of the loading dock opening. The header structure may be a compressible member similar in construction to the side members and, in some cases, may include a weighted fabric curtain that hangs downwardly to contact the top of a truck trailer to form an environmental barrier along the top of the trailer.

Another type of dock seal uses inflatable side members and a header structure having internal compressible resilient pads, which provide some degree of side member compressibility when the side members are in a deflated condition. In either case, when the rear portion of a vehicle (e.g., a truck trailer) is backed into either a foam or an inflatable dock seal side and header members, the side and header members compress toward the building wall to form a seal along the lateral and top back edges of the vehicle. If present, the head curtain sweeps along a top of a trailer to form a seal at the top of the trailer between the side members. Dock seals typically consume a relatively small amount of wall space and can provide a relatively high quality seal between the rear edges of a vehicle and the outside building wall surrounding the dock. However, when the dock seal side members are compressed, they may be displaced into or otherwise encroach on the opening to the rear of the docked vehicle. As a result, the compressed side member may interfere with operation of a fork lift and/or an operator during loading and unloading activities. In addition, inflatable dock seals are susceptible to power losses and tears that compromise the ability of the side members to inflate to provide an acceptable seal.

In contrast to dock seals, some known dock shelters use side members that are mounted to the outside building wall surrounding the loading dock. The side members are spaced well to the outside of the sides of a docked vehicle. The side members are configured to extend (i.e., to be cantilevered) an appreciable distance from the outside building wall, particularly in cases where a dock leveler protrudes from the dock opening. The side members may also support flexible seal members or side curtains extending inwardly from the side members across at least a portion of the opening defined by the side members. When a vehicle such as, for example, a truck trailer, is backed into the opening of the dock shelter, the inwardly facing edges of the seal members or side curtains resiliently deflect and sweep against the lateral sides of the trailer to form an environmental barrier therebetween. As with dock seals, dock shelters also typically include a header structure, which may include a head curtain, to form an environmental barrier along the top edge of the rear of the vehicle.

In contrast to dock seals, dock shelters typically provide unobstructed access to a vehicle cargo area opening (i.e., there are no foam pads or the like to be compressed and displaced into the opening). However, most known dock shelter side members are constructed using rigid wood, fiberglass or metal frames capable of supporting the significant weight of the seal members or side curtains, which are usually held at an appreciable distance (e.g., several feet) from the building wall. Such side members may be permanently deformed if they are impacted by a vehicle. Accordingly, bumpers or stops may be mounted to the lower edge of the dock shelter to prevent a vehicle (e.g., a truck trailer) from impacting and damaging the rigid shelter.

More recently, dock shelters having impactable side members have been developed. The impactable side members are similar to those used with dock seals and typically use a foam core or body surrounded by a coated fabric outer layer. Seal members or side curtains, which may be constructed using a fabric and flexible fiberglass stays combination or a foam core and fabric combination, are typically mounted to the side members to extend at least partially across the shelter opening. When a vehicle is backed into the shelter, the inwardly facing edges of the seal members or side curtains deflect and sweep against the sides of the vehicle to form an environmental barrier or seal against the sides of the vehicle. In the event the off-center position of a vehicle results in the rear of the vehicle impacting a side member, the foam core or body of the side member is resiliently compressed. When the vehicle is pulled away from an impacted side member, the foam core of the side member causes the side member to substantially recover to its original condition or shape.

BRIEF DESCRIPTION OF THE DRAWINGS

FIG. 1 is an exploded isometric view of an example weather barrier constructed in accordance with the teachings disclosed herein.

FIG. 2 is an exploded isometric view of another example weather barrier constructed in accordance with the teachings disclosed herein.

FIG. 15 is an exploded isometric view similar to FIG. 1 but showing another example weather barrier constructed in accordance with the teachings disclosed herein.

FIG. 16 is an exploded isometric view similar to FIG. 2 but showing another example weather barrier constructed in accordance with the teachings disclosed herein.

Figure 3:
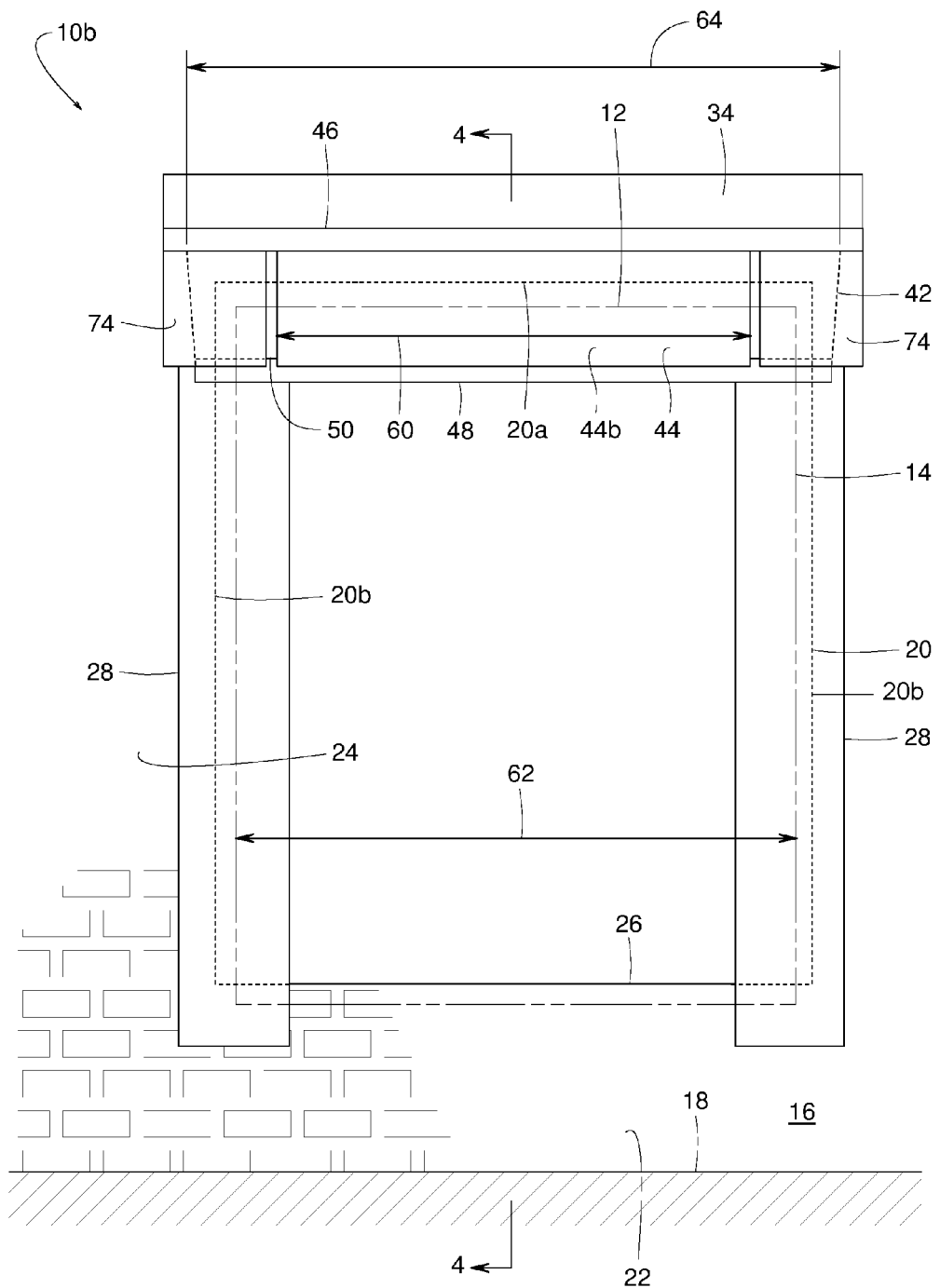
FIG. 3 is a front view of the example weather barrier shown in FIG. 2.
Figure 4:
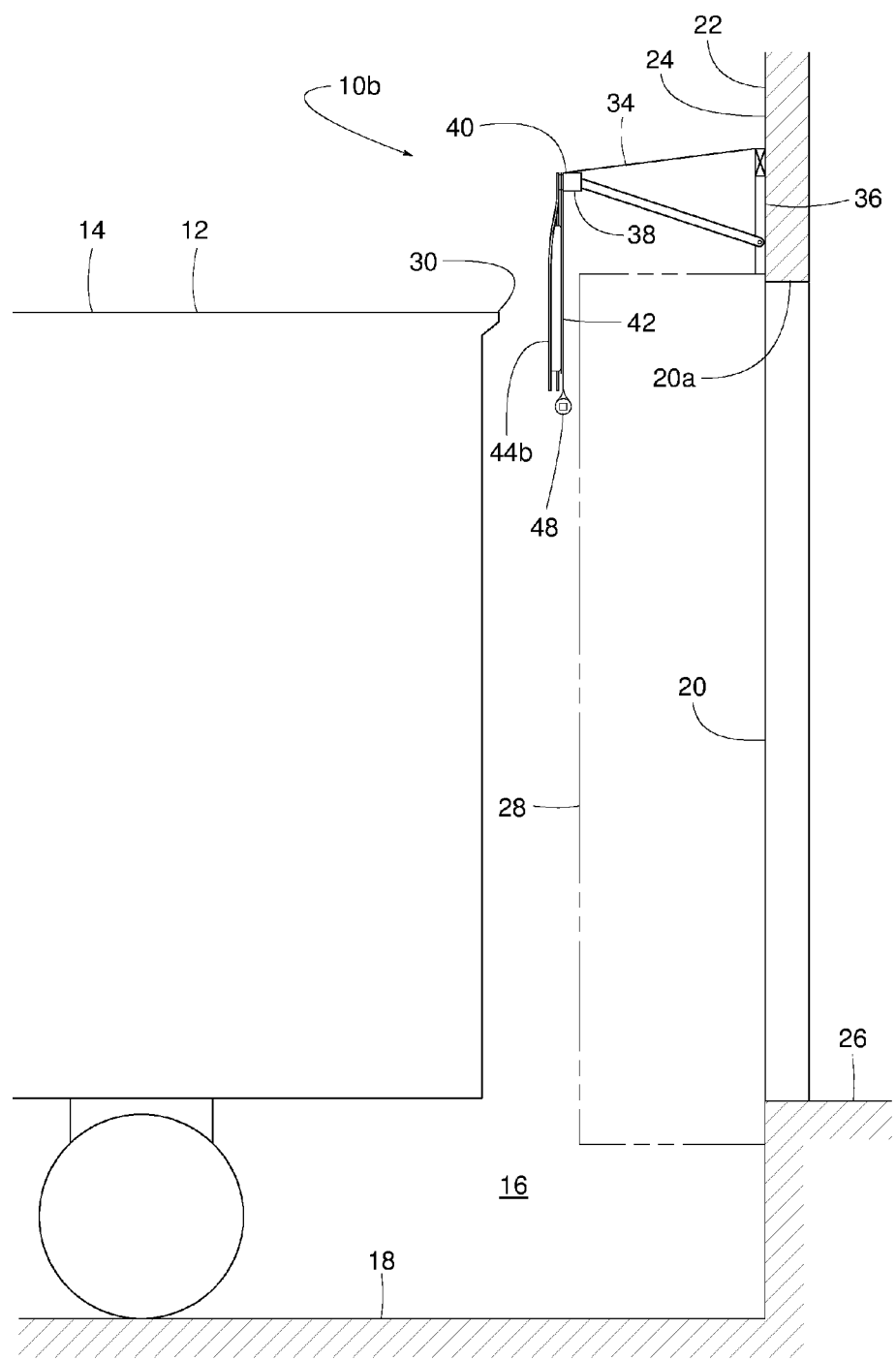
FIG. 4 is a cross-sectional view taken along line 4-4 of FIG. 3.

Wherever possible, the same reference numbers will be used throughout the drawing(s) and accompanying written description to refer to the same or like parts. As used in this description, stating that any part (e.g., a layer) is in any way positioned on (e.g., positioned on, located on, disposed on, or formed on, etc.) another part, means that the referenced part is either in contact with the other part, or that the referenced part is above the other part with one or more intermediate part(s) located there between. Stating that any part is in direct contact with another part means that there is no intermediate part between the two parts. As used herein, substantially and approximately mean within about 10% (e.g., 10 degrees) different than the number at issue. In some examples, vertical, perpendicular, substantially vertical or substantially perpendicular include 90 degrees plus or minus 10%. For example, approximately 90 degrees means 90 degrees plus or minus 10% (e.g., between about 81 degrees and 99 degrees). In some examples, horizontal, parallel, substantially horizontal or substantially parallel means 0 degrees plus or minus 10 degrees.

DETAILED DESCRIPTION

Example weather barriers for sealing a vehicle parked at a loading dock are disclosed herein. An example weather barrier includes features to prevent or restrict protruding upper rear corners of a vehicle from puncturing a front panel and/or a back curtain of the example weather barrier disclosed herein. In some examples, a width (e.g., a crosswise width or horizontal distance) of the vehicle may be greater than a width (e.g., a crosswise width or horizontal distance) of the front panel but less than a width (e.g., a crosswise width or horizontal distance) of the back curtain. In some examples, the front panel may be spaced about three inches in front of the back curtain to provide an area of clearance into which the protruding upper rear corners of the vehicle can enter or be positioned without engaging the front panel and/or the back curtain (e.g., at least not until the vehicle is nearly and/or at a final parked position). Prior to reaching the final parked position, an upper rear edge (between the protruding corners) of the vehicle can engage the front panel to safely push both the front panel and/or the back curtain back and position the front panel and/or the back curtain on a top or upper surface of the vehicle (e.g., a roof of the vehicle).

FIGS. 1-16 show various examples of a weather barrier 10 (e.g., weather barriers 10a-f) for sealing against a roof 12 of a vehicle 14 (e.g., truck, trailer, etc.) parked or positioned at a loading dock 16. In some examples, a dock 16 includes a driveway 18 leading to a doorway 20 in an exterior wall 22 of a building 24. The wall 22 defines the doorway 20 along an upper doorway edge 20a and two lateral doorway edges 20b. An interior platform 26 of the building 24 facilitates transferring cargo between an elevated bed of the vehicle 14 and the interior of the building 24. To further facilitate the transfer of cargo, some examples of the dock 16 also include a conventional dock leveler, a vehicle restraint, bumpers and/or other known dock-related equipment. In some examples, a pair of side members 28 are mounted to the wall 22 along lateral edges 20b of doorway 20 to help seal against the rear side (e.g., vertical) edges of the vehicle 14. The side members 28 are schematically illustrated to represent all types of known side members including, but not limited to, those described in the Background section of this patent.

Figure 8:
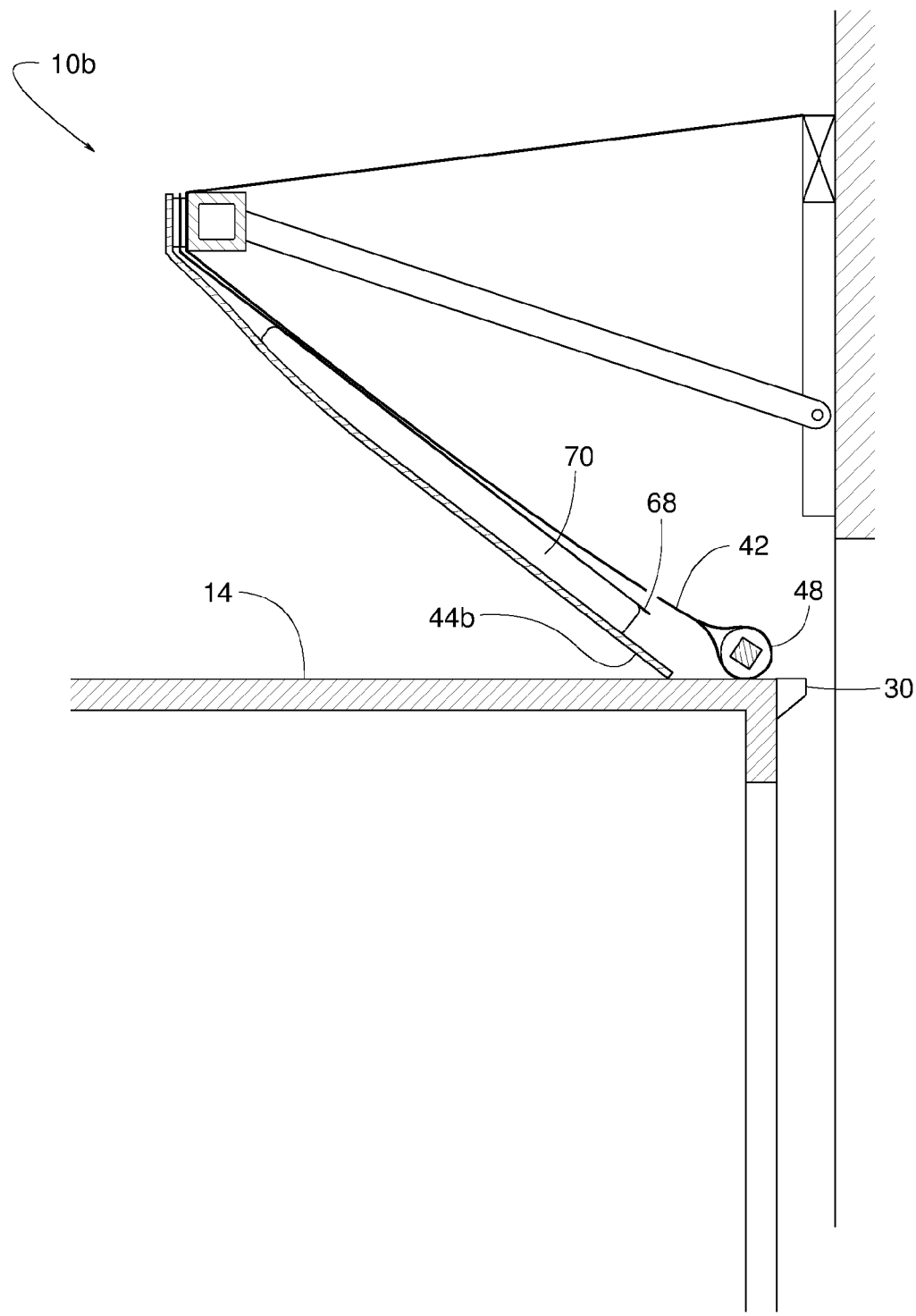
FIG. 8 is a cross-sectional view similar to FIG. 7 but showing the vehicle having moved even closer to the wall.

Weather barriers 10a-f of the illustrated examples are designed to avoid damage from an impact of the vehicle 14 such as, for example, from relatively sharp corner edges 30 protruding from upper rear corners of the vehicle 14 as the vehicle 14 engages and moves the weather barrier 10 from a pendant configuration (e.g., FIG. 5) to a deflected configuration (e.g., FIG. 8). In some examples, the protruding corner edges 30 of the vehicle 14 extend beyond the upper rear edge 32 of the vehicle 14 and can cut or damage conventional header curtains. The example weather barrier 10 (e.g., the weather barriers 10a-f) restrict or prevent the vehicle 14 (e.g., the protruding corner edges 30) from damaging or cutting the weather barrier 10.

In this illustrated example, weather barrier 10a includes a canopy 34 having a back end 36 attached to the wall 22, a front bar 38 at a front end 40 of the canopy 34, a relatively flexible back curtain 42 hanging from the front bar 38 of the canopy 34, and a protective front panel 44 hanging in front of the back curtain 42. In some examples, the front panel 44 is less flexible and/or more rigid than the back curtain 42. Examples of the front panel 44 include, but are not limited to, the front panels 44a, 44b, 44c, 44d, 44e and 44f. The front bar 38 is schematically illustrated to represent any structural member having sufficient strength and rigidity to at least support the weight of the back curtain 42. The back curtain 42 can be made of any sheet material sufficiently flexible to conform to the vehicle 12 (e.g., the roof 12 of the vehicle 12). In the illustrated example, the back curtain 42 has an upper curtain edge 46 attached to the front bar 38 of the canopy 34. Some examples of the back curtain 42 includes a pliable 22-ounce vinyl, which has a nominal weight of about 22 ounces per square yard and has a nominal material thickness of about 25 to 28 mils. The term, "pliable" refers to a sheet of material that when folded over onto itself can be subsequently unfolded and flattened without appreciable permanent damage to the sheet of material (e.g., elastically deformable, bendable, etc.).

To enhance sealing engagement against the vehicle 14 (e.g., the roof 12 of the vehicle 14), some examples of the weather barrier 10 include a weighted seal 48 extending horizontally along a lower curtain edge 50 of the back curtain 42. The weighted seal 48 of the illustrated example is situated or positioned below the back curtain 42 and is carried or supported by the back curtain 42. In some examples, the seal 48 is heavier than the sheet material portion of the back curtain 42. Some examples of the weighted seal 48 includes an (e.g., a horizontally) elongate metal bar 52 (e.g., a solid bar, a solid rod, a pipe, a rectangular tube, etc.) encased within a foam sleeve 54. The metal bar 52 adds appreciable weight to the seal 48, and the foam sleeve 54 provides the seal 48 with sufficient compliance to conform to surface irregularities in the vehicle 14 (e.g., the roof 12). In addition or alternatively, to enhance sealing, other examples of the seal 48 have a plurality of flexible lips 56 (e.g., seal 82 in FIG. 11), have a shape of a hollow bulb (e.g., seal 82 in FIG. 11), and/or are made primarily of resiliently compressible foam.

To protect the back curtain 42 from cuts, wear and/or other damage otherwise caused by the vehicle 14 backing directly into and engaging the back curtain 42, the front panel 44 is positioned to hang in front of the back curtain 42 such that the front panel 44 is positioned between the vehicle 14 and the back curtain 42. The front panel 44 is made of a material that is stiffer (e.g., more firm) and/or more durable than the back curtain 42. Example materials of the front panel 44 include, but are not limited to, polyethylene, ultra-high molecular-weight-polyethylene, high-modulus-polyethylene, high-performance-polyethylene, 44-once vinyl coated fabric, nylon fabric, polyester fabric, non-fabric plastic sheeting, and/or other tough plastic material(s). In some examples, the front panel 44 has a material thickness of about one-eighth of an inch. In some examples, as shown in FIG. 1, the front panel 44a includes a plurality of front panel segments 58 for greater flexibility. In other examples, as shown in FIGS. 2-8, the front panel 44b is generally a single or unitary piece. As the vehicle 14 backs into the dock 16, the front panel 44 takes or absorbs the impact from the vehicle's upper rear edge 32 as the vehicle 14 pushes both the front panel 44 and the back curtain 42 up and on top of the vehicle's roof 12. To this end, some examples of the front panel 44 are flexible but not pliable.

To prevent the protruding corner edges 30 of the vehicle 14 from cutting into and/or damaging the front panel 44, an overall panel width 60 (e.g., a horizontal distance between lateral side edges) of the front panel 44, in some examples, is less than a minimum anticipated width 62 of the vehicle 14. Thus, in some examples, the panel width 60 is approximately 50 to 80 percent of an overall curtain width 64 (e.g., a horizontal distance between lateral side edges) of the back curtain 42. With this arrangement, a central portion of the vehicle's upper rear edge 32, rather than the corners 30, is what pushes or engages the front panel 44 back and up as the vehicle 14 backs into dock 16. Although the corners 30 may have some contact with the weather barrier 10, the corners' contact forces against the weather barrier 10 are reduced (e.g., minimized).

In some examples, the panel width 60 and the curtain width 64 are sized to accommodate a common vehicle width 62 of approximately 102 inches. In such examples, the panel width 60 is less than approximately 100 inches, and the curtain width 64 is greater than approximately 100 inches. To accommodate some lateral misalignment of the vehicle 14 at the dock 16, some examples of the weather barrier 10 have a panel width 60 of about 86 to 88 inches and a curtain width 64 of about 116 inches.

Figure 7:
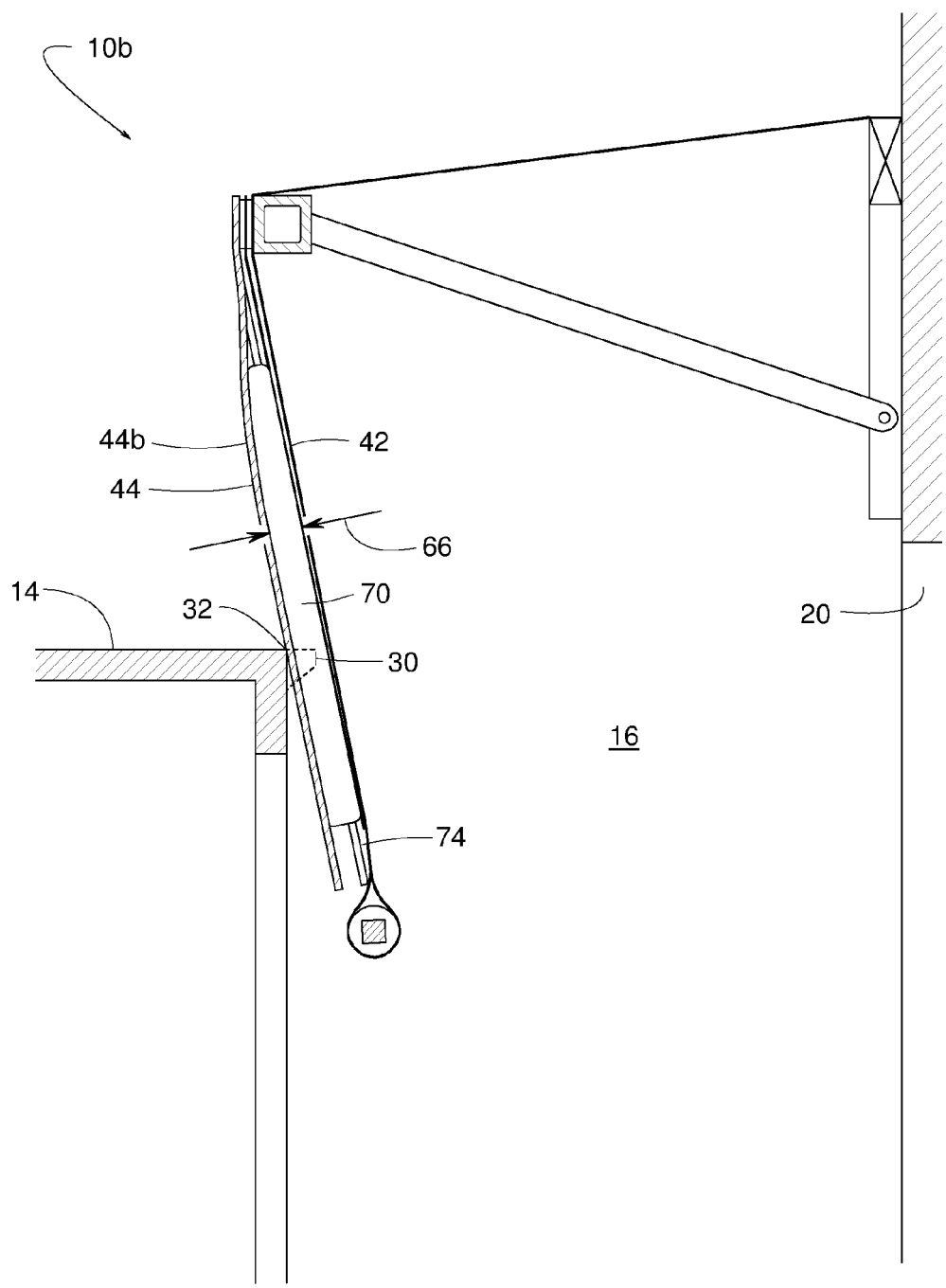
FIG. 7 is a cross-sectional view similar to FIG. 6 but showing the vehicle having moved closer to a wall.

In addition or alternatively, in some examples, a space 66 (FIG. 5) exists between the front panel 44 and the back curtain 42 to prevent the vehicle's protruding corner edges 30 from puncturing the back curtain 42. As the vehicle 14 backs into the dock 16, as shown in FIG. 7, the space 66 creates a clearance between the corner edges 30 and the back curtain 42. The space 66 is appreciably greater than the thickness of the front panel 44. In some examples, the space 66 separates the front panel 44 from the back curtain 42 by a distance of about three to four inches, or at least two inches. To create the space 66, some examples of the weather barrier 10 include an intermediate curtain 68 that holds a resiliently compressible foam pad 70 or 70' (e.g., polyurethane foam) between the front panel 44 and the back curtain 42. The foam pads 70 and 70' are just some examples of a spacer used for creating the space 66. Some examples of the foam pad 70 and 70' are tapered over their height (e.g., see FIGS. 5 and 10) so that the front panel 44 and the back curtain 42 can be connected conveniently up against each other at either their upper and/or lower edges. In some examples, a touch-and-hold fastener 72 (e.g., VELCRO®, which is a registered trademark of Velcro Industries, of Manchester, N.H.) connects the front panel 44, the intermediate curtain 68 and the back curtain 42 to each other along the canopy's front bar 38.

To further protect the back curtain 42 from being damaged by the vehicle's protruding corners 30, some examples of weather barrier 10 include a pair of lateral panels 74 hanging in front of the back curtain 42. Some examples of the lateral panels 74 are made of the same tough material as the front panel 44. In the illustrated example, the lateral panels 74 can move independently and relative to the front panel 44 and/or the back curtain 42. Such independent movement allows the vehicle's protruding corners 30 to travel rearward past the front panel 44 and into the space 66 while still avoiding direct contact with the back curtain 42.

Figure 5:
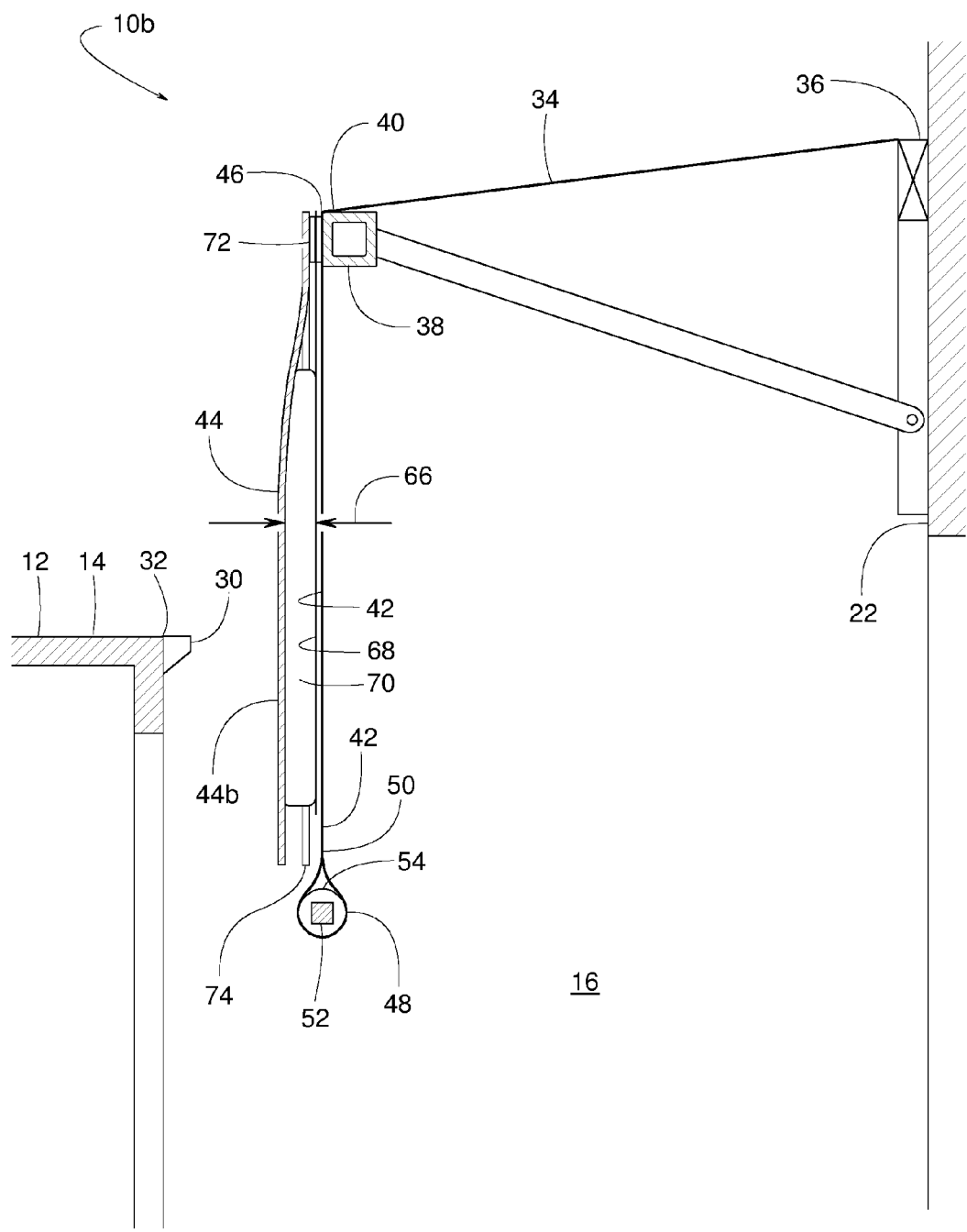
FIG. 5 is an enlarged view of FIG. 4.
Figure 6:
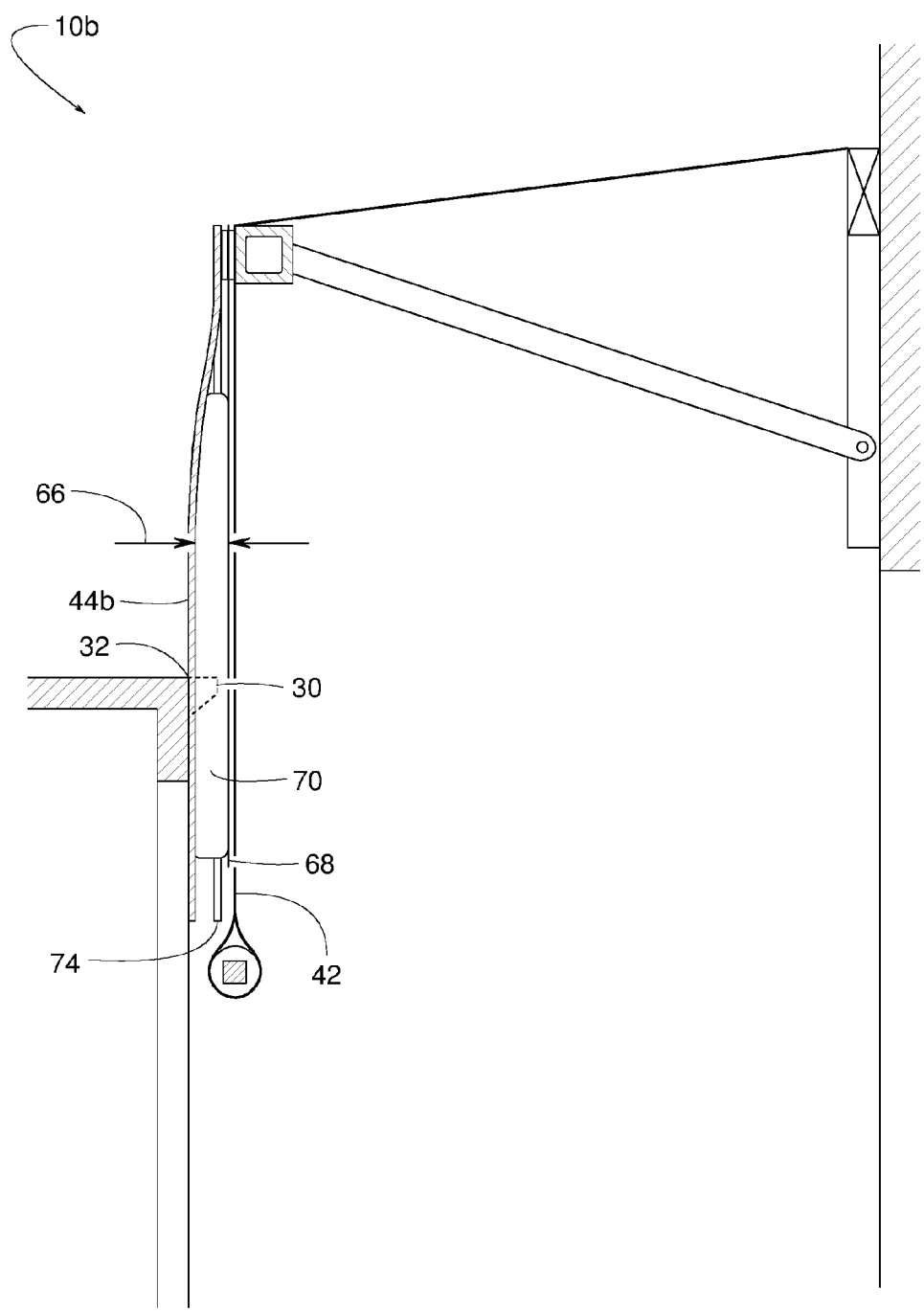
FIG. 6 is a cross-sectional view similar to FIG. 5 but showing a vehicle at a point of initial contact with the example weather barrier of FIG. 2.

FIGS. 5-8 illustrate an example sequence of operation of the vehicle 14 backing into the example weather barrier 10b. FIG. 5 shows the front panel 44b, the back curtain 42, the lateral panels 74, and the intermediate curtain 68 with foam pad 70 all hanging generally pendant as the vehicle 14 backs into the dock 16. FIG. 6 shows the central portion of the vehicle's upper edge 32 making initial contact with the front panel 44b. The vehicle's protruding corners 30 move past the space 66 and push the lateral panels 74 back toward the back curtain 42. FIG. 7 shows further rearward movement of the vehicle 14 results in the vehicle's upper rear edge 32 pushing the front panel back 44b toward the doorway 20. This results in the front panel 44b pushing the foam pad 70 back up against the back curtain 42, thus both the front panel 44b and the back curtain 42 swing back while the space 66 and the lateral panels 74 prevent the vehicle's protruding corners 30 from cutting into the back curtain 42. In response to even further rearward movement of the vehicle 14 (e.g., in a direction toward the doorway 20), the front panel 44b, the back curtain 42 and the weighted seal 48 ride up and over the vehicle 14 to ultimately rest sealingly upon the vehicle's roof 12, as shown in FIG. 8. While approaching the position shown in FIG. 8, some contact may occur between the vehicle's protruding corners 30 and the back curtain 42. However, at this point the contact forces are greatly diminished because most of the heavy lifting of the back curtain 42 has already happened.

Figure 9:
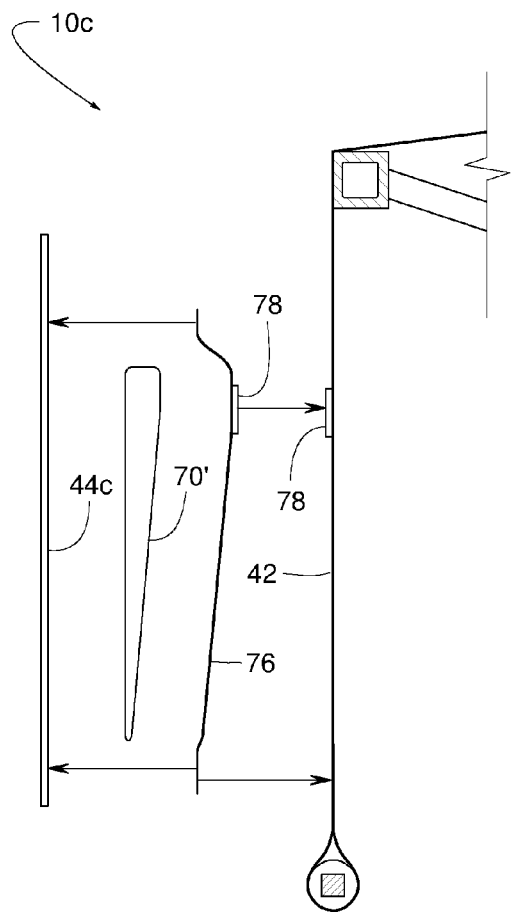
FIG. 9 is an exploded cross-sectional view of another example weather barrier constructed in accordance with the teachings disclosed herein.
Figure 10:
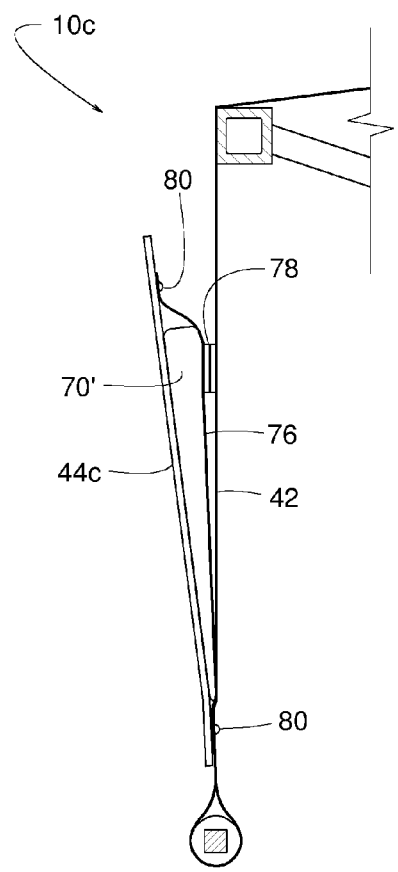
FIG. 10 is a cross-sectional view similar to FIG. 5 but showing the example weather barrier of FIG. 9.
Figure 11:
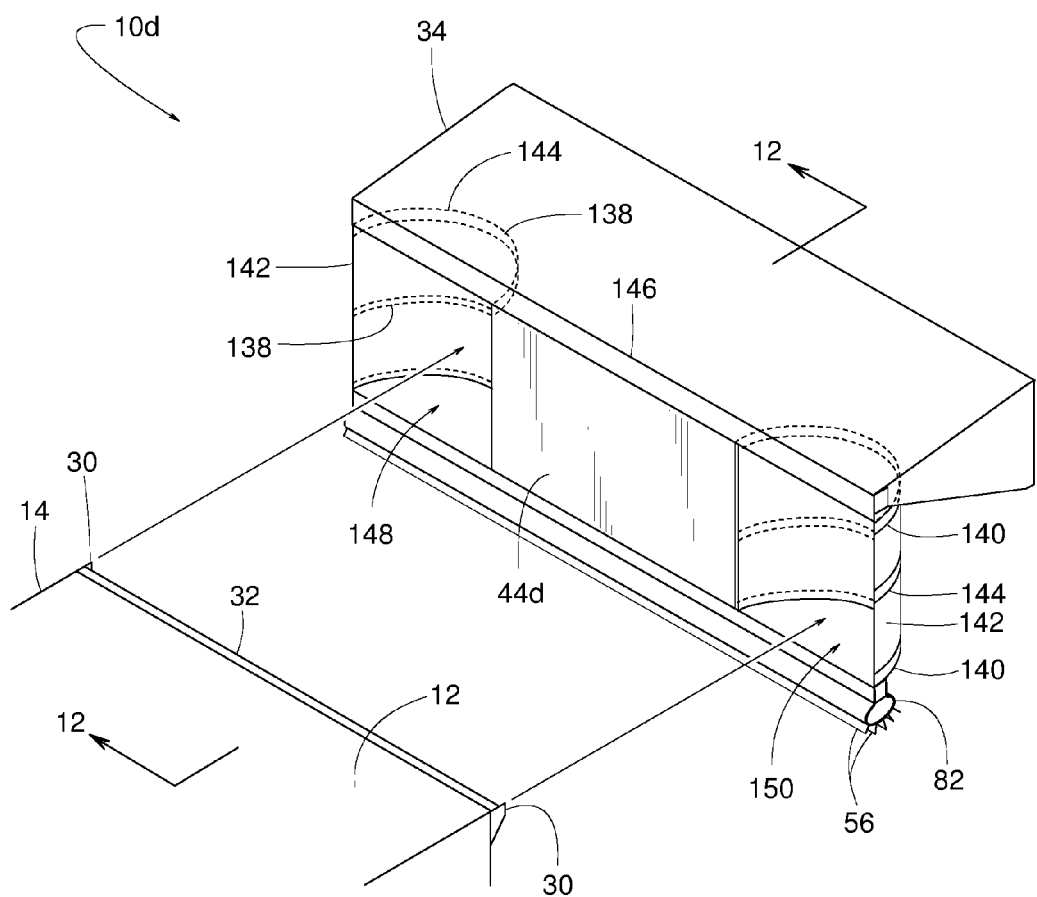
FIG. 11 is an isometric view of another example weather barrier constructed in accordance with the teachings disclosed herein.

In addition or alternatively, FIGS. 9 and 10 show another example weather barrier 10c. In this example, the front panel 44c and an intermediate curtain 76 encapsulates the tapered foam pad 70'. The front panel 44c, the intermediate curtain 76 and the foam pad 70' respectively correspond both structurally and functionally to the front panel 44b, the intermediate curtain 68, and the foam pad 70. In some examples, a conventional fastener 80 connects the intermediate curtain 76 to the front panel 44c, and another fastener 78 (e.g., VELCRO) connects the intermediate curtain 76 to the back curtain 42. The lower fastener 80, in some examples, further connects the back curtain 42 to the front panel 44c.

In another example, shown in FIGS. 11-14, a weather barrier 10d includes a front panel 44d, the weighted seal 82, a first lateral frame 138, a second lateral frame 140, and a pair of back curtains 142 supported by frames 138 and 140. The front panel 44d and the back curtain 142 are similar in material to the front panel 44 and the back curtain 42, respectively. In some examples, the frames 138 and 140 include a plurality of resiliently flexible stays 144 that help hold each back curtain 142 in a certain shape or position. Example materials of the stays 144 include, but are not limited to, fiberglass and/or spring steel.

In the illustrated example, an upper edge 146 along the front panel 44d connects to the front bar 38 of the canopy 34. The connection provides a pivotal connection that allows the front panel 44d and the curtains 142 to pivot back in response to the vehicle 14 backing underneath and/or engaging the canopy 34. As the vehicle 14 backs into the dock 16, the front panel 44d provides an impactable surface against which the vehicle's upper rear edge 32 can push or engage. In the illustrated example, the stays 144 hold each curtain 142 in a semi-cylindrical shape, which creates two pockets. For example, a first concavity 148 and a second concavity 150 are created into which the vehicle's upper rear corners 30 can enter or positioned so as not to damage the front panel 44g and/or the curtains 142.

Figure 12:
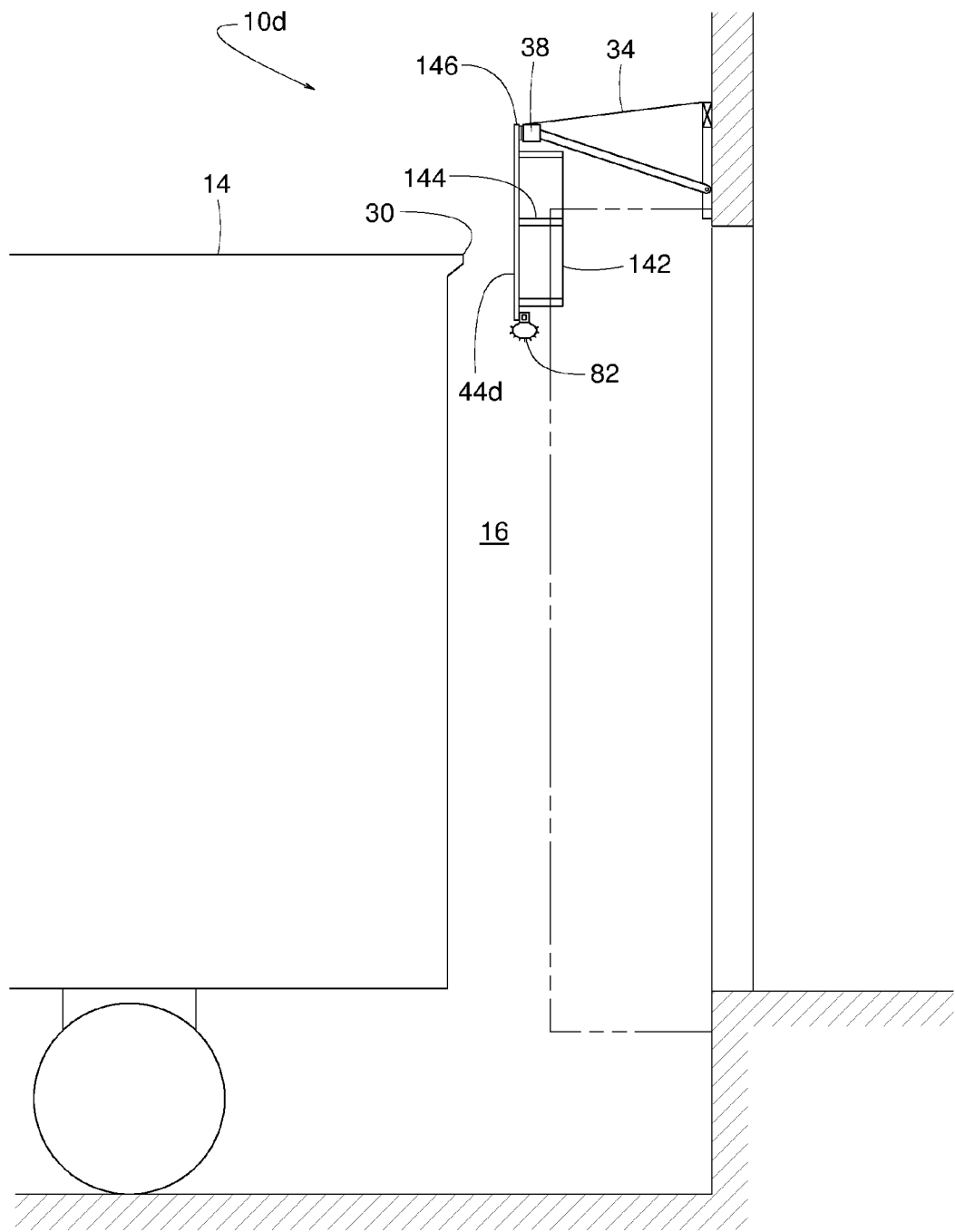
FIG. 12 is a cross-sectional view taken along line 12-12 of FIG. 11.
Figure 13:
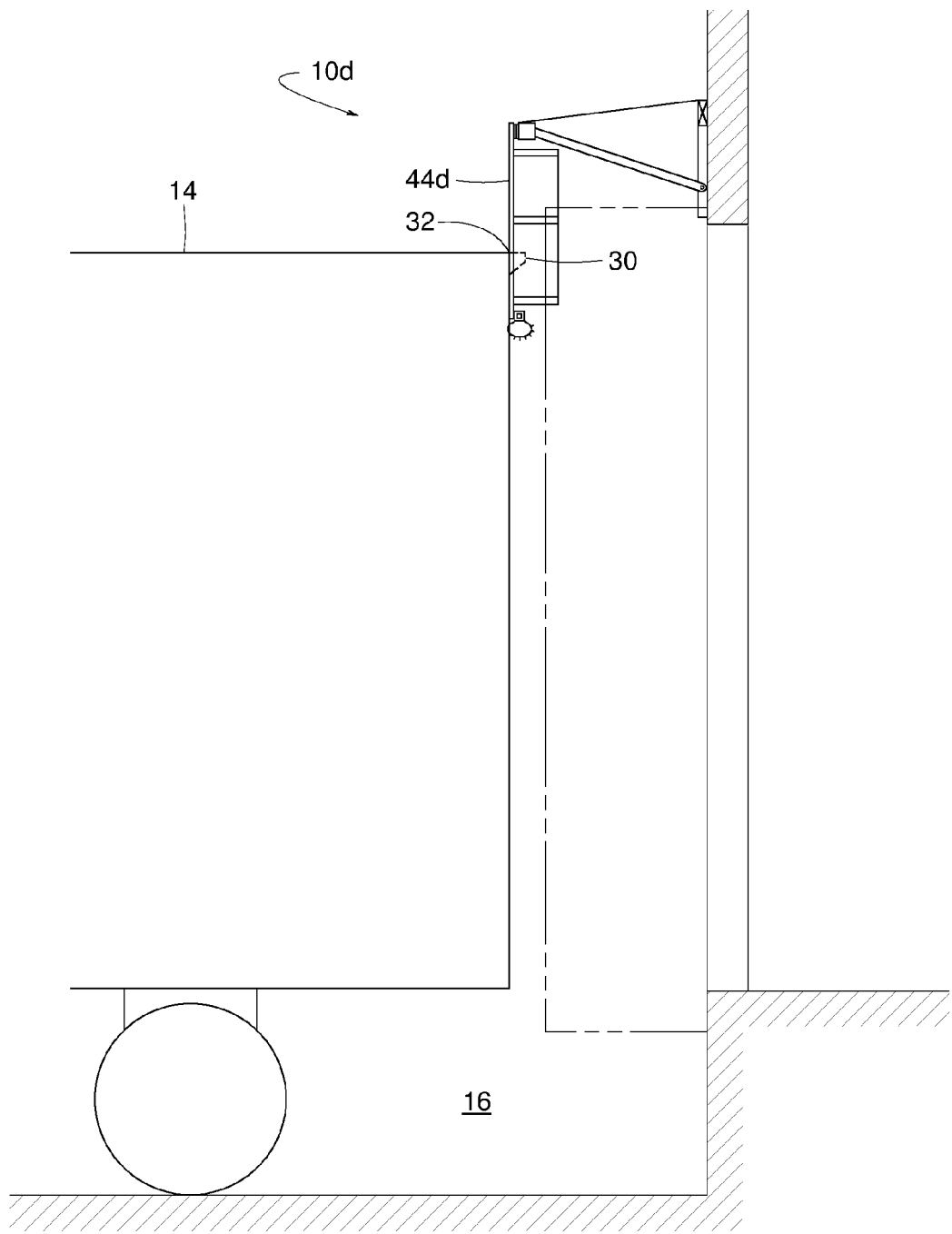
FIG. 13 is a cross-sectional view similar to FIG. 12 but showing a vehicle making initial contact with the example weather barrier of FIG. 11.
Figure 14:
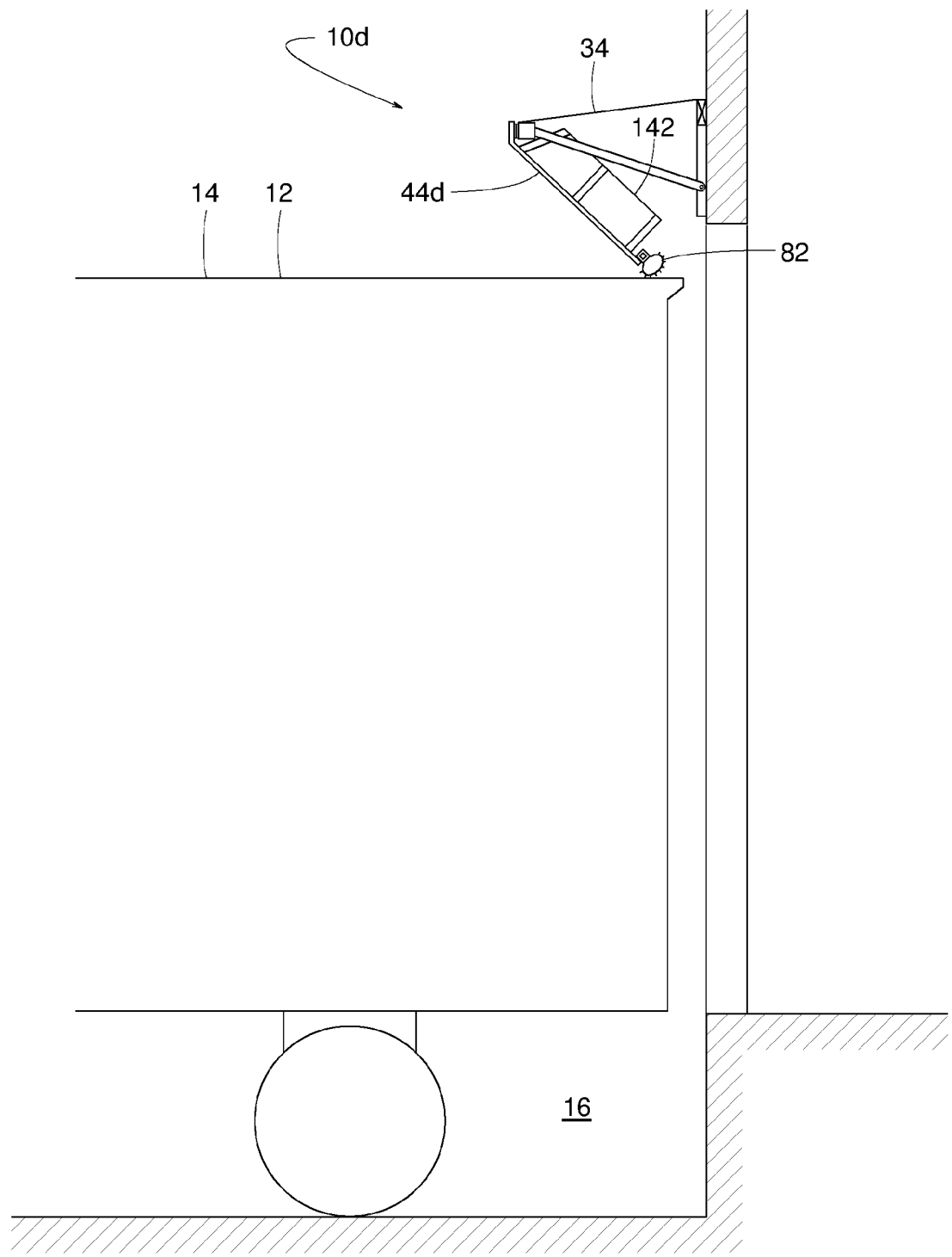
FIG. 14 is a cross-sectional view similar to FIG. 13 but showing the example weather barrier of FIG. 11 in a deflected configuration.

FIGS. 12, 13 and 14 illustrate an example sequence of operation of the vehicle 14 backing into the weather barrier 10d. FIG. 12 shows the weather barrier 10d in a pendant configuration as the vehicle 14 backs into the dock 16. In the pendant configuration, the open areas of concavities 148 and 150 face forward away from the wall 22. FIG. 13 shows the central portion of the vehicle's upper edge 32 making initial contact with the front panel 44d. At this point in the docking operation, the vehicle's corners 30 protrude into the concavities 148 and 150, thereby avoiding damage to the front panel 44d and the back curtains 142. FIG. 14 shows further rearward movement of the vehicle 14 (e.g., toward the wall 22) resulting in the vehicle's upper rear edge 32 pushing or engaging the front panel 44d back and up to place or position the seal 82 on top of the vehicle's roof 12. At this point, the weather barrier 10d is in the deflected configuration. In the deflected configuration, the shape of the lateral frames 138 and 140 can become distorted, and the open areas of concavities 148 and 150 face in a more downward direction (e.g., toward the roof 12 of the vehicle 14).

FIG. 15 shows an example weather barrier 10e similar to the example weather barrier 10a. However, a front panel 44e of the weather barrier 10e is wider (i.e., horizontally longer) than the front panel 44a of the example weather barrier 10a. In the illustrated example, the front panel 44e and the back curtain 42 are approximately the same width (e.g., a panel width 154 and a curtain width 64 are about equal or the same). To help prevent the vehicle's corner edges 30 from puncturing or damaging the lateral areas 74' of the front panel 44e, each foam pad 70 (spacer) is the same horizontal width as shown in FIGS. 1, 2, 15 and 16 and is significantly less than the widths of the front panel 44e and the back curtain 42. In other words, in some examples, the foam pad 70 (spacer) has a spacer width 152 that is less than the panel width 154 and/or is less than the curtain width 64.

The foam pad's width 152 (i.e., a horizontal length) is less than the front panel width 154 to create an air gap or space 66 (FIG. 5) between the back curtain 42 and the lateral areas 74' of the front panel 44e. So, if the vehicle's corner edges 30 poke against or engage the front panel 44e, the front panel's lateral areas 74' can readily deflect into the space 66, thereby reducing (e.g., minimizing) the force that the vehicle's corner edges 30 apply against the front panel 44e. Consequently, as vehicle 14 backs into the dock 16, the vehicle's upper rear edge 32 exerts most of the force to lift the front panel 44e and the back curtain 42 up and on top of the vehicle's roof 12.

FIG. 16 shows an example weather barrier 10f similar to the example weather barrier 10b. However, the front panel 44f of the weather barrier 10f is wider (i.e., horizontally longer) than the front panel 44b of the weather barrier 10b. In the illustrated example, the front panel 44f and the back curtain 42 are approximately the same width (e.g., a panel width 154 and a curtain width 64 are about equal or the same). To help prevent the vehicle's corner edges 30 from puncturing or damaging the lateral areas 74" of front panel 44f, each foam pad 70 (e.g., a spacer) is the same horizontal width as shown in FIGS. 1, 2, 15 and 16 and is significantly less than the widths of the front panel 44f and the back curtain 42. In other words, in some examples, foam pad 70 (e.g., the spacer) has a spacer width 152 that is less than the panel width 154 and/or is less than the curtain width 64.

The foam pad's width 152 (i.e., a horizontal length) is less than the front panel width 154 to create an air gap or space 66 (FIG. 5) between the back curtain 42 and the lateral areas 74" of the front panel 44f. So, if the vehicle's corner edges 30 poke against or engage the front panel 44f, the front panel's lateral areas 74" can readily deflect into the space 66, thereby reducing (e.g., minimizing) the force that the vehicle's corner edges 30 apply against the front panel 44f. Consequently, as the vehicle 14 backs into the dock 16, the vehicle's upper rear edge 32 exerts most of the force to lift the front panel 44f and the back curtain 42 up and on top of the vehicle's roof 12.

At least some of the aforementioned examples include one or more features and/or benefits including, but not limited to, the following:

In some examples, a weather barrier for at least partially sealing or sheltering a vehicle parked at a loading dock of a building, where the building has a doorway in a wall, and the doorway has an upper doorway edge, includes a canopy having a back end and a front end. In some examples, the back end is mountable to the wall above the doorway. In some examples, the front end to protrude forward from the wall when the canopy is mounted to the wall. In some examples, a front bar at the front end of the canopy. In some examples, the front bar being horizontally elongate. In some examples, a back curtain hangs from the front bar. In some examples, the back curtain has an upper curtain edge attached to the front bar. In some examples, the back curtain has a lower curtain edge that is at a lower elevation than an elevation of the upper doorway edge when the canopy is mounted to the wall. In some examples, the back curtain has a curtain width. In some examples, a front panel hangs in front of the back curtain. In some examples, the front panel is less flexible than the back curtain. In some examples, the front panel has a panel width that is approximately 50 to 80 percent of the curtain width. In some examples, a space is interposed between and defined by the front panel and the back curtain.

In some examples, the panel width is less than 100 inches, and the curtain width is greater than 100 inches.

In some examples, the space provides a distance of at least two inches between the back curtain and the front panel.

In some examples, the front panel has a dimensional thickness that is greater than a dimensional thickness of the back curtain.

In some examples, the front panel and the back curtain are distinguishable from each other by way of material composition.

In some examples, a foam pad is disposed within the space between the front panel and the back curtain.

In some examples, a foam pad disposed within the space between the front panel and the back curtain, and the foam pad has thickness that varies over a vertical length of the foam pad.

In some examples, a pair of lateral panels hang in front of the back curtain. In some examples, the front panel is interposed laterally between the pair of lateral panels. In some examples, the back curtain is more flexible than the pair of lateral panels. In some examples, the front panel is independently movable relative to the pair of lateral panels, the back curtain being independently movable relative to the pair of lateral panels.

In some examples, a weighted seal extending horizontally along the lower curtain edge, the weighted seal being carried by the back curtain, the weighted seal being heavier than the back curtain.

In some examples, the back curtain is both flexible and pliable while the front panel is flexible but not pliable.

In some examples, a weather barrier for at least partially sealing or sheltering a vehicle parked at a loading dock of a building, where the building has a doorway in a wall, the doorway has an upper doorway edge, and the weather barrier is selectively configurable between a pendant configuration and a deflected configuration includes a canopy having a back end and a front end. In some examples, the back end is mountable to the wall above the doorway. In some examples, the front end protruding forward from the wall when the canopy is mounted to the wall. In some examples, a front bar at the front end of the canopy. In some examples, the front bar is horizontally elongate. In some examples, the weather barrier has a first lateral frame. In some examples, the weather barrier has a second lateral frame. In some examples, a front panel is laterally interposed between the first lateral frame and the second lateral frame. In some examples, the front panel hangs from the front bar. In some examples, the front panel has an upper panel edge proximate the front bar. In some examples, the front panel has a lower panel edge that is below the upper panel edge when the weather barrier is in the pendant configuration. In some examples, the lower panel edge is closer to the wall when the weather barrier is in the deflected configuration than when the weather barrier is in the pendant configuration. In some examples, a first back curtain is attached to the first lateral frame. In some examples, the first back curtain defines a first concavity being open and facing forward away from the wall when the weather barrier is in the pendant configuration. In some examples, the first concavity faces more downward when the weather barrier is in the deflected configuration. In some examples, a second back curtain is attached to the second lateral frame. In some examples, the second back curtain defines a second concavity being open and facing forward away from the wall when the weather barrier is in the pendant configuration. In some examples, the second concavity faces more downward when the weather barrier is in the deflected configuration.

In some examples, the front panel and the back curtain are distinguishable from each other by way of material composition.

In some examples, the back curtain is both flexible and pliable while the front panel is flexible but not pliable.

In some examples, the front panel has a panel width that is less than 100 inches.

In some examples, the first lateral frame and the second lateral frame include a fiberglass material.

In some examples, a weighted seal hangs below the front panel when the weather barrier is in the pendant configuration.

In some examples, a weather barrier for at least partially sealing or sheltering a vehicle parked at a loading dock of a building, where the building has a doorway in a wall, and the doorway has an upper doorway edge, includes a canopy having a back end and a front end. In some examples, the back end is mountable to the wall above the doorway. In some examples, the front end protruding forward from the wall when the canopy is mounted to the wall. In some examples, a front bar at the front end of the canopy, the front bar being elongate in a lateral direction. In some examples, a back curtain hanging from the front bar. In some examples, the back curtain has an upper curtain edge attached to the front bar. In some examples, the back curtain has a lower curtain edge that is at a lower elevation than that of the upper doorway edge when the canopy is mounted to the wall. In some examples, the back curtain has a curtain width extending in the lateral direction. In some examples, a front panel hangs in front of the back curtain. In some examples, the front panel is less flexible than the back curtain, the front panel having a panel width extending in the lateral direction. In some examples, a spacer is disposed in front of the back curtain and behind the front panel to create a space that is interposed between and defined by the front panel and back curtain. In some examples, the spacer has a spacer width extending in the lateral direction. In some examples, the spacer width is less than the panel width. In some examples, the spacer width is less than the curtain width.

In some examples, the spacer width is less than 100 inches, and the panel width is greater than 100 inches.

In some examples, the spacer provides a distance of at least two inches between the back curtain and the front panel.

In some examples, the front panel is thicker than the back curtain.

In some examples, the front panel and the back curtain are distinguishable from each other by way of material composition.

In some examples, the spacer includes a foam pad.

In some examples, the spacer has thickness that varies over a vertical length of the spacer.

In some examples, the back curtain is both flexible and pliable while the front panel is flexible but not pliable.

Although certain example methods, apparatus and articles of manufacture have been described herein, the scope of the coverage of this patent is not limited thereto. On the contrary, this patent covers all methods, apparatus and articles of manufacture fairly falling within the scope of the appended claims either literally or under the doctrine of equivalents.

The invention claimed is:

1. A weather barrier for at least partially sealing or sheltering a vehicle parked at a loading dock of a building, wherein the building has a doorway in a wall, and the doorway has an upper doorway edge, the weather barrier comprising:

a canopy having a back end and a front end, the back end being mountable to the wall above the doorway, the front end to protrude forward from the wall when the canopy is mounted to the wall;

a front bar at the front end of the canopy, the front bar being horizontally elongate;

a back curtain hanging from the front bar, the back curtain having an upper curtain edge attached to the front bar, the back curtain having a lower curtain edge that is at a lower elevation than an elevation of the upper doorway edge when the canopy is mounted to the wall, the back curtain having a curtain width;

a front panel hanging in front of the back curtain, the front panel being less flexible than the back curtain, the front panel having a panel width that is approximately 50 to 80 percent of the curtain width; and a space being interposed between and defined by the front panel and the back curtain.

2. The weather barrier of claim 1, wherein the panel width is less than 100 inches, and the curtain width is greater than 100 inches.

3. The weather barrier of claim 1, wherein the space provides a distance of at least two inches between the back curtain and the front panel.

4. The weather barrier of claim 1, wherein the front panel has a dimensional thickness that is greater than a dimensional thickness of the back curtain.

5. The weather barrier of claim 1, wherein the front panel and the back curtain are distinguishable from each other by way of material composition.

6. The weather barrier of claim 1, further including a foam pad disposed within the space between the front panel and the back curtain.

7. The weather barrier of claim 1, further including a foam pad disposed within the space between the front panel and the back curtain, and the foam pad has thickness that varies over a vertical length of the foam pad.

8. The weather barrier of claim 1, further including a pair of lateral panels hanging in front of the back curtain, the front panel being interposed laterally between the pair of lateral panels, the back curtain being more flexible than the pair of lateral panels, the front panel being independently movable relative to the pair of lateral panels, the back curtain being independently movable relative to the pair of lateral panels.

9. The weather barrier of claim 1, further including a weighted seal extending horizontally along the lower curtain edge, the weighted seal being carried by the back curtain, the weighted seal being heavier than the back curtain.

10. The weather barrier of claim 1, wherein the back curtain is both flexible and pliable while the front panel is flexible but not pliable.

11. A weather barrier for at least partially sealing or sheltering a vehicle parked at a loading dock of a building, wherein the building has a doorway in a wall, the doorway has an upper doorway edge, and the weather barrier is selectively configurable between a pendant configuration and a deflected configuration, the weather barrier comprising:

a canopy having a back end and a front end, the back end being mountable to the wall above the doorway, the front end protruding forward from the wall when the canopy is mounted to the wall;

a front bar at the front end of the canopy, the front bar being horizontally elongate;

a first lateral frame;

a second lateral frame;

a front panel laterally interposed between the first lateral frame and the second lateral frame, the front panel hanging from the front bar, the front panel having an upper panel edge proximate the front bar, the front panel having a lower panel edge that is below the upper panel edge when the weather barrier is in the pendant configuration, the lower panel edge being closer to the wall when the weather barrier is in the deflected configuration than when the weather barrier is in the pendant configuration;

a first back curtain attached to the first lateral frame, the first back curtain defining a first concavity being open and facing forward away from the wall when the weather barrier is in the pendant configuration, the first concavity facing more downward when the weather barrier is in the deflected configuration; and a second back curtain attached to the second lateral frame, the second back curtain defining a second concavity being open and facing forward away from the wall when the weather barrier is in the pendant configuration, the second concavity facing more downward when the weather barrier is in the deflected configuration.

12. The weather barrier of claim 11, wherein the front panel and the back curtain are distinguishable from each other by way of material composition.

13. The weather barrier of claim 11, wherein the back curtain is both flexible and pliable while the front panel is flexible but not pliable.

14. The weather barrier of claim 11, wherein the front panel has a panel width that is less than 100 inches.

15. The weather barrier of claim 11, wherein the first lateral frame and the second lateral frame include a fiberglass material.

16. The weather barrier of claim 11, further includes a weighted seal hanging below the front panel when the weather barrier is in the pendant configuration.

17. A weather barrier for at least partially sealing or sheltering a vehicle parked at a loading dock of a building, wherein the building has a doorway in a wall, and the doorway has an upper doorway edge, the weather barrier comprising:

a canopy having a back end and a front end, the back end being mountable to the wall above the doorway, the front end protruding forward from the wall when the canopy is mounted to the wall;

a front bar at the front end of the canopy, the front bar being elongate in a lateral direction;

a back curtain hanging from the front bar, the back curtain having an upper curtain edge attached to the front bar, the back curtain having a lower curtain edge that is at a lower elevation than that of the upper doorway edge when the canopy is mounted to the wall, the back curtain having a curtain width extending in the lateral direction;

a front panel hanging in front of the back curtain, the front panel being less flexible than the back curtain, the front panel having a panel width extending in the lateral direction; and a spacer disposed in front of the back curtain and behind the front panel to create a space that is interposed between and defined by the front panel and back curtain, the spacer having a spacer width extending in the lateral direction, the spacer width being less than the panel width, and the spacer width being less than the curtain width.

18. The weather barrier of claim 17, wherein the spacer width is less than 100 inches, and the panel width is greater than 100 inches.

19. The weather barrier of claim 17, wherein the spacer provides a distance of at least two inches between the back curtain and the front panel.

20. The weather barrier of claim 17, wherein the front panel is thicker than the back curtain.

21. The weather barrier of claim 17, wherein the front panel and the back curtain are distinguishable from each other by way of material composition.

22. The weather barrier of claim 17, wherein the spacer includes a foam pad.

23. The weather barrier of claim 17, wherein the spacer has thickness that varies over a vertical length of the spacer.

24. The weather barrier of claim 17, wherein the back curtain is both flexible and pliable while the front panel is flexible but not pliable.

* * * * *